(12) United States Patent
Wendt et al.

(10) Patent No.: US 10,598,227 B2
(45) Date of Patent: Mar. 24, 2020

(54) INSTALLATION UNIT AND METHOD FOR INSTALLING A BEARING UNIT

(71) Applicant: Aktiebolaget SKF, Gothenburg (SE)

(72) Inventors: Volker Wendt, Uechtelhausen/Zell (DE); Johannes Zang, Schweinfurt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 376 days.

(21) Appl. No.: 15/377,565

(22) Filed: Dec. 13, 2016

(65) Prior Publication Data
US 2018/0163787 A1   Jun. 14, 2018

(51) Int. Cl.
| | |
|---|---|
| *F16C 41/04* | (2006.01) |
| *F16C 19/54* | (2006.01) |
| *F16C 33/78* | (2006.01) |
| *F16C 19/36* | (2006.01) |
| *F16C 19/38* | (2006.01) |
| *B60B 27/00* | (2006.01) |

(52) U.S. Cl.
CPC ............ *F16C 41/04* (2013.01); *F16C 19/364* (2013.01); *F16C 19/386* (2013.01); *F16C 19/543* (2013.01); *F16C 33/7813* (2013.01); *B60B 27/001* (2013.01); *F16C 2326/02* (2013.01)

(58) Field of Classification Search
CPC ........ F16C 41/04; F16C 35/067; F16C 36/06; F16C 33/605; Y10T 29/49696
USPC ...................................................... 29/898.07
See application file for complete search history.

(56) References Cited

U.S. PATENT DOCUMENTS

| | | | | |
|---|---|---|---|---|
| 2,142,946 A | * | 1/1939 | Klamp | ................ F16C 19/386 384/571 |
| 2,142,958 A | * | 1/1939 | Slusser | ................ F16C 19/386 384/571 |

(Continued)

FOREIGN PATENT DOCUMENTS

| | | | | |
|---|---|---|---|---|
| DE | 2815078 A1 | * | 10/1979 | ............ F16C 41/045 |
| DE | 4126940 A1 | * | 2/1993 | .............. F16C 43/04 |

(Continued)

OTHER PUBLICATIONS

Machine Translation of DE102009025536 (Year: 2010).*

(Continued)

*Primary Examiner* — Jacob J Cigna
*Assistant Examiner* — Michael W Hotchkiss
(74) *Attorney, Agent, or Firm* — J-TEK Law PLLC; Scott T. Wakeman; Mark A. Ussai

(57) ABSTRACT

An installation unit for installing a bearing unit includes a carrier having an interior and the bearing unit mounted in the interior. The bearing unit includes a first rolling-element row and a second rolling-element row, and both the first rolling-element row and the second rolling-element row are at least partially disposed inside the carrier. The bearing unit is slidingly mounted in the carrier such that, when an end opening of the carrier is aligned with an opening in a bearing housing, applying a force against the bearing unit will slide the bearing unit out of the carrier and into the opening in the bearing housing. Also, a method of installing the bearing unit in the opening in the housing using the installation unit.

13 Claims, 1 Drawing Sheet

(56) References Cited

U.S. PATENT DOCUMENTS

| | | | | |
|---|---|---|---|---|
| 3,986,754 A * | 10/1976 | Torrant | ............... | F16C 19/183 |
| | | | | 384/504 |
| 4,798,482 A * | 1/1989 | Kruk | ................ | F16C 19/542 |
| | | | | 384/571 |
| 5,150,973 A * | 9/1992 | Masur | ..................... | B25B 9/00 |
| | | | | 384/448 |
| 5,492,419 A * | 2/1996 | Miller | .................. | F16C 19/386 |
| | | | | 384/551 |
| 5,667,313 A * | 9/1997 | Kapaan | ............... | B60B 27/001 |
| | | | | 384/504 |
| 6,550,972 B1 * | 4/2003 | Adolph | ............... | F16C 41/045 |
| | | | | 384/448 |
| 7,121,728 B2 * | 10/2006 | Pete | .................... | F16C 19/386 |
| | | | | 384/477 |

FOREIGN PATENT DOCUMENTS

| | | | | |
|---|---|---|---|---|
| DE | 102009025536 A1 * | 12/2010 | ........... | F16C 33/605 |
| GB | 2073332 A * | 10/1981 | ........... | F16C 19/385 |
| WO | WO-2012045491 A1 * | 4/2012 | ........... | B60B 27/001 |

OTHER PUBLICATIONS

Machine Translation of DE2815078 (Year: 1979).*
Machine Translation of DE102009025536A1 (Year: 2010).*
Machine Translation of DE-4126940-A1 (Year: 1993).*
Machine Translation of WO-2012045491-A1 (Year: 2012).*

* cited by examiner

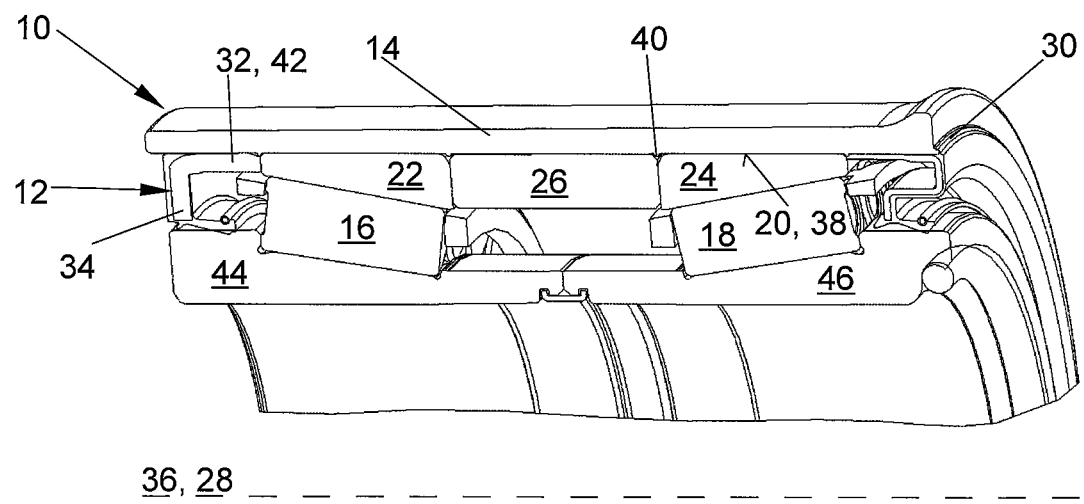

INSTALLATION UNIT AND METHOD FOR INSTALLING A BEARING UNIT

TECHNOLOGICAL FIELD

The present disclosure is directed to installation units and associated methods for installing a bearing assembly having at least two rows of rolling elements in an opening in a housing.

BACKGROUND

Installation units are known from DE 10 2009 025 536 A1 that can be used for installing wheel bearings, specifically tapered roller bearings.

SUMMARY

An installation unit for installing a bearing unit is disclosed which comprises a combination of the bearing unit and at least one carrier. The bearing unit comprises at least first and second rows of rolling-elements, and both rolling-element rows are at least partially disposed inside the carrier. According to the disclosure a high efficiency is achieved. In particular a common installation of at least two rolling-element bearings in one housing can be achieved.

The carrier is preferably configured one-piece. "One-piece" is meant to mean in particular from one injection and/or from one casting. A common installation of at least two rolling-element bearings can thereby be achieved in a particularly simple and cost-effective manner.

The bearing unit portion of the installation unit comprises a first outer ring, on which at least one part of the first rolling-element row abuts, and at least one second outer ring, on which at least one part of the second rolling-element row abuts, and at least one component, such as a spacer ring, which is disposed at least partially between the first outer ring and the second outer ring with respect to an axial direction of the first outer ring. The at least one component maintains a space between the first and second outer rings. In this manner, two bearings that have no common outer ring, but rather each have their own outer ring, can be commonly installed and can be maintained at the same distance. Thus in addition to the common, simple installation there is also the advantage that a construction including two individual outer rings is more cost-effective than a common, one-piece outer ring. In particular it can thereby be achieved that the production volumes of individual outer rings are increased so that the production costs for these outer rings drop.

The bearing unit can be a wheel bearing unit.

Furthermore, a method for installing a bearing unit in a bearing housing using the installation unit is disclosed in which method the installation unit is positioned relative to the bearing housing and subsequently at least two rolling-element rows are inserted together into the bearing housing. A high efficiency can thereby be achieved. In particular, a rapid and easy installation can be achieved.

Further advantages will be better appreciated from the following description and the attached drawing. An exemplary embodiment of the invention is depicted in the drawing. The drawing, the description, and the claims contain numerous features in combination. The person skilled in the art will also advantageously consider the features individually and combine them into further meaningful combinations.

BRIEF DESCRIPTION OF THE DRAWING

FIG. 1 shows a part of a partial section through an inventive installation unit along a longitudinal direction of the installation unit.

DETAILED DESCRIPTION

FIG. 1 shows an installation unit 10 that includes a bearing unit 12 and a carrier 14, and the installation unit 10 is configured for preinstallation and final installation of the bearing unit 12. The bearing unit 12 comprises a first rolling-element bearing that includes an inner ring 44, a first rolling-element row 16, and an outer ring 22. Furthermore, the bearing unit 12 includes a second rolling-element bearing that includes an inner ring 46, a second rolling-element row 18, and an outer ring 24. At least a part of the rolling-element row 16 abuts on the outer ring 22. Moreover, at least a part of the rolling-element row 18 abuts on the outer ring 24. The bearing unit 12 is disposed completely inside the carrier 14, and the carrier 14 is essentially sleeve-shaped, one-piece and comprised of plastic. The two inner rings 16, 18 are held together by a clip ring.

Furthermore, the bearing unit 12 includes a ring-shaped component or spacer 26 that abuts on an inner surface 38 of the carrier 14. The component 26 is disposed between the first outer ring 22 and the second outer ring 24 with respect to an axial direction 28 of the first outer ring 22 and furthermore abuts on mutually facing end sides of the first and second outer rings 22, 24, and thereby defines a minimum spacing between the first and second outer rings 22, 24. Furthermore, the component 26 can be comprised of steel. The first and second outer rings 22, 24 both abut on the inner surface 38 of the carrier 14. The bearing unit 12 is disposed inside the carrier 14 with a slight press-fit.

A component 32 (a seal ring) of the installation unit 10 abuts on an end side of the first outer ring 22, which end side is facing away from the second outer ring 24, and includes a partial region 34 (a flange) that protrudes radially inward toward the axis of rotation 36 of the bearing unit 10. If the bearing unit 10 is installed then the outer ring rotates during an operation process relative to the inner rings about the axis of rotation 36. A radially outer surface of the component 32 abuts on the inner surface 38 of the carrier 14. The component 32 forms a seal carrier 42 wherein elastomer that seals against the inner ring 44 is attached to the component 32 and in particular to the partial region 34.

The component 32 is sturdy. To install the bearing unit, a force is applied onto the outer ring 24 by using a punch or ram to apply a force on the side of the component 32 that faces away from the outer ring 22. The force may be up to 20 tons, and the component 32 is configured to remain functional despite this large force. The carrier 14 includes a projection 40, which protrudes slightly between the component 26 and the outer ring 14 and thereby causes a retaining force to be exerted on the component 26 by the projection 40 during a transport of the installation unit 10. Furthermore, on its inner surface 38 the carrier 14 includes further projections with analogous function for other components. A ring-shaped centering element 30 of the bearing unit is disposed on an axial inside of the bearing unit 12, which axial inside opposes the axial inside on which the component 32 is disposed; the centering element 30 is formed by a metal-plate element covered with elastomer, wherein the elastomer seals tightly relative to the inner ring 46. The centering element 30 protrudes in the axial direction starting from inside carrier 14 along the carrier 14 and out into a region outside the carrier 14. With the installation of the bearing unit 12 in the bearing housing the centering element 30 is initially placed in a corresponding opening of the bearing housing so that a radial-side shifting of the installation unit 10 relative to the bearing housing is prevented. Upon applying force on the component 32 using the punch or ram, the bearing unit 12 then shifts relative to the carrier 14 and slides out of the carrier and into the opening of the bearing housing, wherein a guide surface 20, which is formed by the inner surface 38 of the carrier 14, guides a movement of the entire bearing unit 12 into the opening. The projections, i.e., in particular, the projection 40, do not prevent a movement of the bearing unit 12 relative to the carrier 14. Inside the carrier 14 a cylindrical region is left open directly adjacent to the component 32 so that the punch or ram can be easily positioned in this region prior to an application of force.

Since the entire bearing unit 12 is disposed inside the carrier 14 prior to installation, it is possible to uniformly center the parts of the bearing unit 12 relative to one another and with respect to the bearing housing. Furthermore, the bearings and seals can be inserted into the bearing housing in a single press stroke, which reduces the installation effort, in particular compared to so-called taper matched units (with these all outer rings and seals must be sequentially installed into the bearing housing). In addition, for example, damage to seals that are not precisely centered at a point in time of the installation process is avoided. The arrangement of the entire bearing unit 12 inside the carrier 14 prior to the installation brings with it the further advantage that the penetration of dirt into the bearing unit 12 is prevented, and it is also prevented that lubricant of the bearing leaks out and is lost.

The end side of the carrier bearing opposite the component 32 can have a chamfer corresponding to the bearing housing so that a positioning of the carrier 14 relative to the bearing housing is simplified.

After the installation process the carrier 14 is undamaged and can be reused and returned to a factory wherein the installation unit 10 is manufactured. If this return is too complicated, it is advantageous to only provide the required rigidity for the carrier 14 in order to save costs. In an advantageous manner the punch or a plate made from plastic is delivered together with the installation unit so that the force can be transmitted in a simple manner onto the bearing unit. It can thereby be ensured that the customer has a suitable device for force transmission onto the bearing unit during the installation.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide an improved installation unit and method for installing a bearing unit.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

10 Installation unit
12 Bearing unit
14 Carrier
16 Rolling-element row
18 Rolling-element row
20 Guide surface
22 Outer ring
24 Outer ring
26 Component
28 Direction
30 Centering element
32 Component
34 Partial region
36 Axis of rotation
38 Inner surface
40 Projection
42 Seal carrier
44 Inner ring
46 Inner ring

We claim:

1. An installation unit for installing a bearing unit, the installation unit comprising:
 a carrier of one-piece construction having an interior; and
 a bearing unit mounted in the interior and including a first rolling-element row and a second rolling-element row, each of the first rolling-element row and the second rolling-element row being at least partially disposed inside the carrier;
 wherein the bearing unit is slidingly mounted in the carrier such that, when an end opening of the carrier is aligned with an opening in a bearing housing, applying a force against the bearing unit will slide the bearing unit out of the carrier and into the opening in the bearing housing, and
 wherein the installation unit further comprises:
 a first outer ring on which at least a part of the first rolling-element row abuts;
 at least one second outer ring, on which at least a part of the second rolling-element row abuts; and
 at least one spacer axially disposed between the first outer ring and the second outer ring, and
 wherein the carrier includes at least one integral projection on an inner surface at a junction of the first outer ring and the spacer.

2. The installation unit according to claim 1, wherein the installation unit further comprises at least one centering element, different from the carrier, configured to center the installation unit relative to the opening, the centering element comprising a seal carrier having an elastomeric seal body mounted thereon.

3. The installation unit according to claim 1, wherein the installation unit further comprises an annular bracket having an axial leg slidably abutting an interior surface of the carrier and a radially leg extending radially inward from the axial leg toward an axis of rotation of the bearing unit.

4. The installation unit according to claim 1,
wherein the interior of the installation unit includes at least one guide surface configured to guide at least one outer ring of the bearing unit when the bearing unit slides out of the carrier,
wherein the carrier is substantially sleeve-shaped,
wherein the installation unit includes at least one centering element, different from the carrier, configured to center the installation unit relative to the opening, and
wherein the installation unit includes a seal carrier at an end side of an outer ring of the bearing unit having a flange that protrudes radially inward toward an axis of rotation of the bearing unit and an elastomeric seal body mounted on the seal carrier.

5. The installation unit according to claim 1,
wherein the first rolling-element row is located between a first inner bearing ring and the first outer bearing ring of a first rolling-element bearing and the second rolling-element row is located between a second inner bearing ring and the second outer bearing ring of a second rolling-element bearing, and
wherein the first inner bearing ring and the second inner bearing ring are held together by a clip ring in the interior of the carrier.

6. The installation unit according to claim 1, including a seal carrier at an end side of the first outer ring, the seal carrier having a flange that protrudes radially inward toward an axis of rotation of the bearing unit, and an elastomeric seal body mounted on the seal carrier.

7. The installation unit according to claim 6, wherein the elastomeric seal body is connected to a radially inner end of the flange and extends axially inward from the flange.

8. A method for installing a bearing unit into a bearing housing, the method comprising the steps of:
providing a bearing housing having an opening;
providing an installation unit including a one-piece carrier having an interior and a bearing unit mounted in the carrier interior, the bearing unit including a first outer ring, a first rolling-element row in contact with the first outer ring, a second outer ring and a second rolling-element row in contact with the second outer ring and a spacer ring different from the first outer ring and different from the second outer ring separating the first outer ring from the second outer ring, each of the first rolling-element row and the second rolling-element row being at least partially disposed inside the carrier, the bearing unit being slidingly mounted in the carrier;
the bearing unit further including an annular bracket having an axial leg slidably abutting the inner surface of the carrier and a radial leg extending radially inward from the axial leg toward an axis of rotation of the bearing unit,
aligning the installation unit with the opening in the bearing housing; and
applying a force against the radial leg of the annular bracket to slide the bearing unit out of the carrier and into the bearing housing.

9. The method according to claim 8, including an elastomeric seal body at a radially inner end of the radial leg.

10. The method according to claim 8,
wherein the first rolling-element row is located between a first inner bearing ring and the first outer bearing ring of a first rolling-element bearing and the second rolling-element row is located between a second inner bearing ring and the second outer bearing ring of a second rolling-element bearing, and
wherein the interior is bounded by a cylindrical surface;
wherein the first outer bearing ring contacts a first portion of the cylindrical surface and the second outer bearing ring contacts a second portion of the cylindrical surface; and
wherein applying the force against the radial leg to slide the bearing unit out of the carrier comprises sliding the second outer bearing ring along the first portion of the cylindrical surface.

11. An installation unit comprising:
a sleeve-shaped carrier having an interior defined by a cylindrical inner surface and first and second axial end openings; and
a bearing unit comprising a first rolling-element bearing having a first outer ring and a first row of rolling elements and a second rolling-element bearing having a second outer ring and second row of rolling elements, and a spacer ring different from the first outer ring and different from the second outer ring axially separating the first outer ring from the second outer ring;
wherein the first outer ring and the second outer ring are disposed in the interior in contact with the inner surface of the carrier and retained in the interior by a press fit, and
wherein the installation unit is configured such that, when the interior of the carrier is aligned with an opening in a bearing housing, applying a force against a first axial end of the bearing unit slides the bearing unit out of the carrier and into the opening in the bearing housing
wherein the carrier includes at least one integral projection on the cylindrical inner surface at a location between the first outer ring and the spacer ring.

12. The installation unit according to claim 11, wherein the bearing unit includes a first seal carrier at a first axial end of the carrier and a first elastomeric seal body mounted on the first seal carrier and a second seal carrier at a second axial end of the carrier, the second seal carrier comprising a centering ring, and a second elastomeric body mounted on the second seal carrier.

13. The installation unit according to claim 11,
wherein the first rolling-element bearing has a first inner ring and the second rolling-element bearing has a second inner ring, and
wherein the first inner bearing ring and the second inner bearing ring are held together by a clip ring in the interior of the carrier.

* * * * *